(12) United States Patent
Pylant

(10) Patent No.: US 7,333,633 B2
(45) Date of Patent: Feb. 19, 2008

(54) INTER-FRAME VIDEO TECHNIQUES FOR BEHAVIORAL ANALYSIS OF LABORATORY ANIMALS

(75) Inventor: Chris David Pylant, Arlington, TX (US)

(73) Assignee: Plexon, Inc., Dallas, TX (US)

( * ) Notice: Subject to any disclaimer, the term of this patent is extended or adjusted under 35 U.S.C. 154(b) by 831 days.

(21) Appl. No.: 10/698,634

(22) Filed: Oct. 31, 2003

(65) Prior Publication Data

US 2005/0092259 A1 May 5, 2005

(51) Int. Cl.
*G06K 9/62* (2006.01)
(52) U.S. Cl. .................. 382/107; 382/172; 348/155
(58) Field of Classification Search ........... 382/103, 382/106, 107, 118, 128–132, 162, 168, 181, 382/194, 203, 224, 232, 243, 274–276, 291, 382/305, 133; 378/21; 340/531; 348/149, 348/142, 155; 715/716
See application file for complete search history.

(56) References Cited

U.S. PATENT DOCUMENTS

| | | | |
|---|---|---|---|
| 6,678,413 B1 * | 1/2004 | Liang et al. | 382/181 |
| 6,819,739 B2 * | 11/2004 | Eppler | 378/21 |
| 6,850,252 B1 * | 2/2005 | Hoffberg | 715/716 |
| 6,972,677 B2 * | 12/2005 | Coulthard | 340/531 |
| 6,985,172 B1 * | 1/2006 | Rigney et al. | 348/149 |
| 6,996,261 B2 * | 2/2006 | deCharms | 382/131 |

OTHER PUBLICATIONS

Pylant, Chris; Animal Position Tracking System Plexon VideoTracker; Users' Guide; Jun. 2003, Version 1.1; Plexon, Inc; United States.

Nicolelis, Miguel A. L. & Chapin, John K., "Controlling Robots with the Mind," Scientific American, Oct. 2002, pp. 25-31, vol. 287, No. 4, Scientific American, Inc., U.S.A.

Marchand, Alain R., Luck, David, & Discala, Georges, "Evaluation of an Improved Automated Analysis of Freezing Behavior in Rats and its Use in Trace Fear Conditioning," Journal of Neuroscience Methods, Jun. 30, 2003, pp. 145-153, vol. 126 No. 2, Elsevier Science B.V., Amsterdam, The Netherlands.

* cited by examiner

*Primary Examiner*—Seyed Azarian
(74) *Attorney, Agent, or Firm*—Carr LLP

(57) ABSTRACT

The present invention provides for making a comparison between a first video frame and a second video frame to determine the extent of a fear reaction in a test animal. Frame comparison logic is configured to quantify any change of a value associated with at least one pixel between the first video frame and the second video frame. A centroid calculator is configured to determine the position of a centroid of a video frame. Brainwaves of a test animal are also simultaneously measured and recorded. A processor correlates, as a matter of time, the recorded brainwaves with the change of status of the pixilated image information as a function of time.

20 Claims, 7 Drawing Sheets

INTER-FRAME VIDEO TECHNIQUES FOR BEHAVIORAL ANALYSIS OF LABORATORY ANIMALS

FIELD OF THE INVENTION

The present invention is generally directed to monitoring animal behavior and, more particularly, to monitoring animal behavior to determine the presence or lack thereof of a fear reaction.

BACKGROUND

The correlation of neural signals ("brainwaves") or neurological impulses in test animals to external and other stimuli is an important part of biological study. One way to correlate animal brainwaves to external stimuli is to track a test animal's position over time, in terms of its center of mass ("centroid"). The change of position of the test animal can be the result of external stimuli. The change of position of the test animal is also manifest as changes in brainwaves. The brainwaves can be quantified through use of a device that can measure electrical signals produced by individual neurons by way of one or more electrodes implanted in the brain or other neural materials, such as the spinal column. The change of the centroid over time can also be quantified. Therefore, reactions by the test animal to external stimuli can be quantified by correlating any changes in the centroid to changes of brainwave activity.

Typically, as the animal moves, perhaps as the result of external stimuli, the animal's image can be recorded many times per second by a video camera. The brainwaves of the test animal are also recorded by a recording device, such as a multi-channel acquisition processor (MAP), wherein the recordings are also time-stamped. Generally, a MAP can be defined as a device that is capable of recording and time-stamping at least two separate data streams at the same time. The position of the test animal, as indicated by its centroid, is calculated by a tracking device. The calculated position of the centroid is also then recorded and time-stamped by the MAP. After both the brainwaves and the centroid positions have been time-stamped and recorded by the MAP, researchers can then correlate the macroscopic behavior of the animal with its concurrent neural activity.

Within the tracking device, the position of the test animal is determined by the calculation of the centroid from video frame to video frame. After each video frame is acquired by the camera, the frame is then sent to the tracking device. The tracking device performs various operations upon each video frame, such as deleting the image of the animal's tail and the image of any wires attached to the animal's skull, increasing the contrast between the test animal and the background, and so on. After these operations are performed, the centroid of the pixels corresponding to the test animal for each video frame is calculated. As discussed above, the centroid can be generally defined as the average "middle" of the animal. Typically, the centroid is plotted in an "X-Y axis"/two dimensional coordinate plane. The test animal's position can be precisely mapped to brainwave measurements. Therefore, reactions by the animal, such as muscular movements as a result of outside stimuli, can be mapped to brainwaves.

However, certain reactions of note of the test animal do not lend themselves to be readily determined by centroid calculation. There are some reactions to external stimuli that can not be readily ascertained as a function of a change of centroid. One such reaction of the test animal is the "fear" reaction. Typically, in a fear reaction, animals "freeze" having less movement than they would if they were merely at rest, sometimes not even breathing until the fear reaction abates. In a fear reaction, the brain of the test animal generates brainwaves, which can be recorded by the MAP. For a researcher, discerning the brainwaves for a fear reaction from the brainwaves from an animal not in fear but "at rest" is a difficult task. Generally, this is because a primary indicator of animal behavior, the position of the centroid from video frame to video frame, may not change.

Therefore, there is a need for a method and a system to discern whether an animal is in a fear reaction that overcomes at least some of the problems associated with conventional fear reaction discernment systems or methods.

SUMMARY OF THE INVENTION

The present invention provides for determining the extent of movement of an object appearing within two or more images. Each point in the images is classified as either on-object or off-object to create classified images. One classified image is compared to at least one other classified image to determine those areas for which the classification differs. At least one neurological impulse is measured. The determination of those areas for which the classification differs to the measurement of the at least one neurological impulse is correlated.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

In the following discussion, numerous specific details are set forth to provide a thorough understanding of the present invention. However, it will be understood that the present invention can be practiced by those skilled in the art following review of this description, without such specific details. In other instances, well-known elements have been illustrated in schematic or block diagram form in order not to obscure the present invention in unnecessary detail. Additionally, for the most part, details concerning feedback systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

Figure 1:
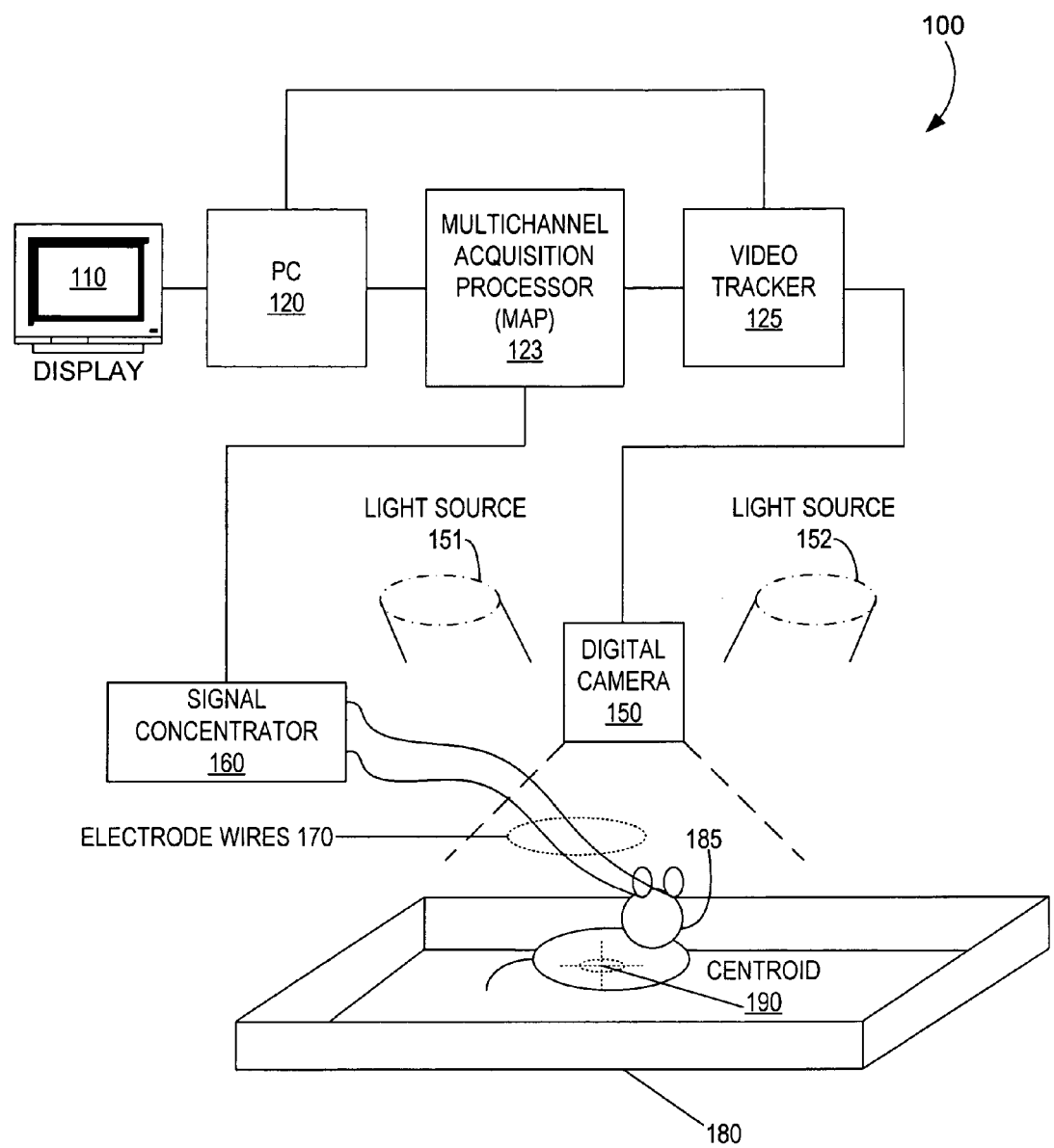
FIG. 1 illustrates a prior art system for correlating centroid position to recorded brainwaves.

Turning now to FIG. 1, illustrated is a prior art system 100 for measuring the change of a centroid position of a test animal from a first video frame to a second video frame. In the system 100, a test animal 185 is allowed to move within a receptacle 180. The system 100 tracks the change of a centroid 190 from video frame to video frame, and correlates these changes to measured brainwaves as a function of time. From these brainwave measurements and any centroid change in position, the correlation of brainwaves to behavior of the test animal can be deduced.

In the system 100, the test animal 185 is illuminated by two light sources 151, 152. The brain and nervous system of the test animal 185 is coupled to a brainwave acquisition processor and concentrator 160 through electrode wires 170 or other suitable means. The concentrator conveys the measured brainwaves of the test animal 185 to the MAP 123. Within the MAP 123, the measured brainwaves are also time-stamped.

The test animal 185 is also photographed at regular intervals, such as 30 times per second, by a camera 150. The resulting image ("video frame") is sent to the video tracker 125. Within the video tracker 125, digital signal processing (DSP) is performed upon each picture element or "pixel" of the image. One of the DSP actions performed by the video tracker 125 is that of determining the centroid 190 of the test animal 185 for each video frame. This information is then conveyed to the MAP 123. The MAP 123 then time stamps the position of the centroid for each video frame. The MAP 123 then correlates the timestamp for the measured brainwaves to the timestamp for the centroid for each video frame. This correlation is then sent to a computing device 120, such as a personal computer (PC) for further analysis. Video frames, including their corresponding centroids, may be sent to the PC 120 for display.

The PC 120 acts as a server for a display 110. The PC 120 can also be used to filter and perform further digital signal processing upon the measured brainwaves time-stamped by the MAP 123. The display 110 can show a video frame, with the calculated centroid, and the change of centroid from video frame to video frame. The display 110 can also show various brainwaves, both in the original form of graphed raw data and processed data. The processing of the brainwaves can be performed as a function of parameters input by a researcher.

Figure 2:
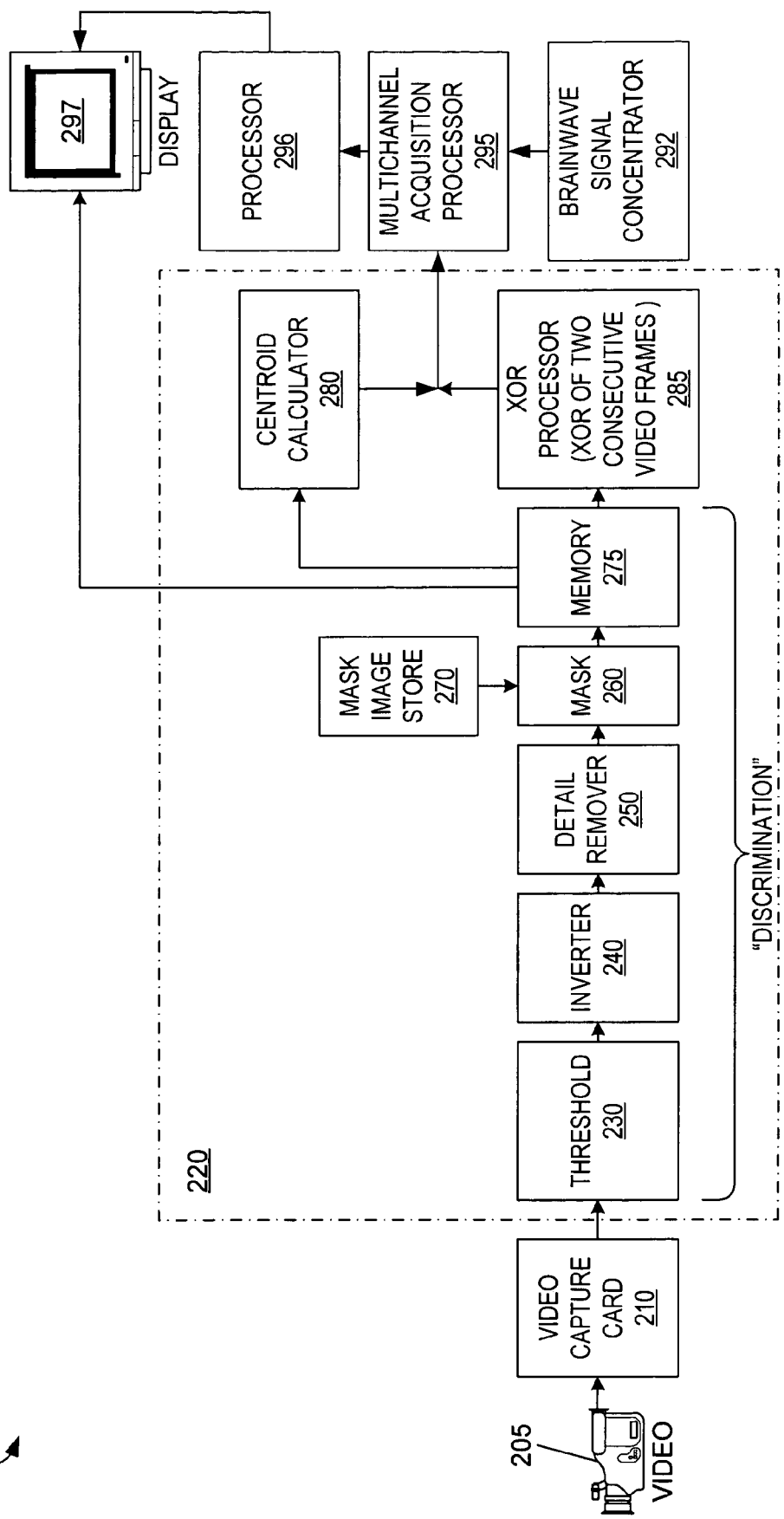
FIG. 2 illustrates a video tracker for determining a change of corresponding pixels from video frame to video frame.

Turning now to FIG. 2, illustrated is a video tracker 200. Generally, the video tracker 200 is configured to exploit a central fact of fear reactions of animals, such as test animals. Typically, animals "freeze up" when undergoing a fear reaction. The fear reaction leads to less movement between frames, such as evinced by a cessation of breathing by the test animal, than would otherwise be present in an animal not in fear mode. While the lack of a change in a centroid position from video frame to video frame is a necessary condition to indicate the presence of a fear mode in a test animal, it is not a sufficient condition, as the test animal could be at rest, grooming, or otherwise occupied rather than exhibiting a true fear reaction.

Generally, in the video tracker system 200, a first video frame is compared to a second video frame. First, each pixel of each frame is determined to lie either on the animal ("animal pixel") or off the animal ("non-animal pixel"). Then the number of pixels which changed state (from animal to non-animal or non-animal to animal) from the first to the second video frame is determined. This number can then be normalized by dividing it by the total number of animal pixels in the second video frame, for example. Dividing the number of changed pixels by the total number of animal pixels in the second frame generates a normalized value with a range from 0.0 to 2.0 in the case where the animal extent (number of pixels occupied) does not change. Generally, the lower the normalized or non-normalized value, the more likely that the animal is in a fear reaction. The normalized or non-normalized value can be output by a video tracker 220 and into a MAP 295 for time-stamping and correlating to measured brainwaves. This normalized or non-normalized value may be referred to as the "inter-frame motion measure" or simply "motion measure".

Within a video tracker 220, a video camera 205 is coupled to a video capture card 210. Each video frame is temporarily stored within the video capture card 210. Then, the video frame is conveyed to the video tracker 220. Alternately, a digital camera with a digital interface such as Institute of Electrical and Electronics Engineers (IEEE) 1394 camera, can be used, which obviates the need for a separate capture card 210.

Within the video tracker 220, discrimination tasks are performed. Generally, the discrimination tasks are image processing operations that help determine where the test animal is within the digitized photograph. When the discrimination task is complete, the status of each pixel of each video frame has been determined to be either on-animal or off-animal. For each pair of processed video frames, the video tracker 220 counts the number of pixels that have changed status, i.e. changed from on-animal to off-animal or from off-animal to on-animal. The video tracker 220 optionally normalizes the result by dividing by the number of on-animal pixels in the second frame, for example. This generates a quantitative normalized value for the likelihood that the test animal is in a fear reaction, with lower values indicating a higher likelihood of a fear reaction.

Within the video tracker 220, the first processing typically performed is a threshold operation 230. Within the threshold operation 230, the light intensity value of each pixel is compared to a configurable threshold value. The threshold operation 230 typically sets recorded pixels with light intensity values less than the configurable threshold value to zero, and all other pixel values to the maximum allowed pixel value, for a video frame. Alternately, pixel values equal to or greater than the threshold are set to a value of one. The thresholded pixel values are then sent to the inverter 240. If the test animal is dark and the background light, an inversion operation can be applied which sets zero-value pixels to the largest value, and the largest value pixels to zero. The application of the inverter 240 can insure that animal pixels are non-zero, even when the intensity of the reflected light from the test animal is lower than the intensity of the reflected light from the background.

After any inversion has been performed in the inverter 240, any necessary detail removal is performed in the detail remover 250. In the detail remover 250, the image of such things as the tail of the test animal is removed so as to not impair the accuracy of the centroid calculation as an estimate of the center of mass of the test animal. Furthermore, the tail may be deleted from consideration from the determination of the normalized change of pixel status. Similarly, any wires coupled to the head of the test animal can skew the change of pixel status calculation, as the wires could be moving, even if the test animal is not moving due to a fear reaction. Therefore, the wires are deleted from consideration prior to the calculation of the centroid or of the inter-frame motion measure calculation.

From the detail remover 250, the processed digitized pixilated values are sent to an optional masking operation 260. Generally, the mask 260 is used to delete an area or areas within the video frame which have the same or a similar intensity of reflected light as the test animal, and which would otherwise erroneously affect the calculation of the centroid or the inter-frame motion detection calculation. The appropriate mask or masks are stored in a mask image store 270. The processed image is then stored in memory 275, for use in comparison by the XOR processor 285. In an alternative embodiment, the processed video frames are stored in memory of the XOR processor 285, itself.

After the mask image from mask image store 270 is applied in the mask operation 260, the processed and discriminated image of the test animal can be displayed on a display 297. The centroid of the test animal for a video frame can be calculated in the centroid calculator 280. The centroid calculator 280 can output the centroid calculation as coordinate points in a Cartesian coordinate system, although other coordinate systems are within the scope of the present invention.

The change in pixel status (on-animal or off-animal) between video frames can be calculated in an XOR processor 285. Determining any change in the pixel by pixel status enables the determination of the degree of similarity of the precise extent occupied by a test animal between video frames. A low normalized or non-normalized value of this "motion measure", indicating high similarity, can be highly indicative of a fear reaction on the part of the test animal.

In the video tracker 220, the inter-frame motion measure can be calculated by exclusively ORing (XORing) within the XOR processor 285 each pixel in the current video frame after discrimination with its corresponding pixel in the previous video frame after discrimination. The discrimination video frame can be generally defined as each video frame after the discrimination operations have been applied.

As is understood by those of skill in the art, an XOR function returns a "true" value, a logical value of one, if both the input values to the XOR logic are different, and a false value, a logical value of zero, if both of the input values are the same. More particularly, in the XOR processor 285, if the same pixel of two separate video frames have the same value (that is, in both frames, both of the corresponding pixels are either on-animal or both are off-animal pixels), the test animal has not moved in or out of the area represented by that pixel (that is, there has been "no movement" for that pixel). Therefore, the XOR processor 285 generates a false value for that pixel. However, if the value of the corresponding pixels of both video frames is different, then the test animal has moved in or out of that pixel. This is expressed within the XOR processor 285 if there is a change between the two corresponding pixels (that is, the test animal has moved in or out of the pixel) and a logical true value is generated for that pixel.

In a further embodiment, the total number of changed pixels, that is, the count of the number of true values output by the XOR processor 285, is divided by the total number of on-animal pixels in the second/later video frame. This creates a normalized measure of animal movement. The normalized level of movement can then be interpreted by researchers as to whether it indicates a fear or non-fear reaction.

The centroid information for each video frame is output from the centroid calculator 280, and well as the motion measure derived from pixel comparisons of video frames by the XOR processor 285, and submitted to the MAP 295. This outputted data is useful for detecting a fear reaction in a test animal. The centroid results and motion measure results are time-stamped by the MAP 285 and may therefore be correlated to each other in time by processor 296 or other processing equipment. The MAP 295 also timestamps the received indicia of brainwave activity of the test animal as received from a brainwave signal concentrator 292 coupled to the test animal through electrical wires or other suitable means. The MAP 295 also thereby allows correlation in time of centroid, motion measure, and neural activity and neurological impulses of the test animal.

Figure 3A:
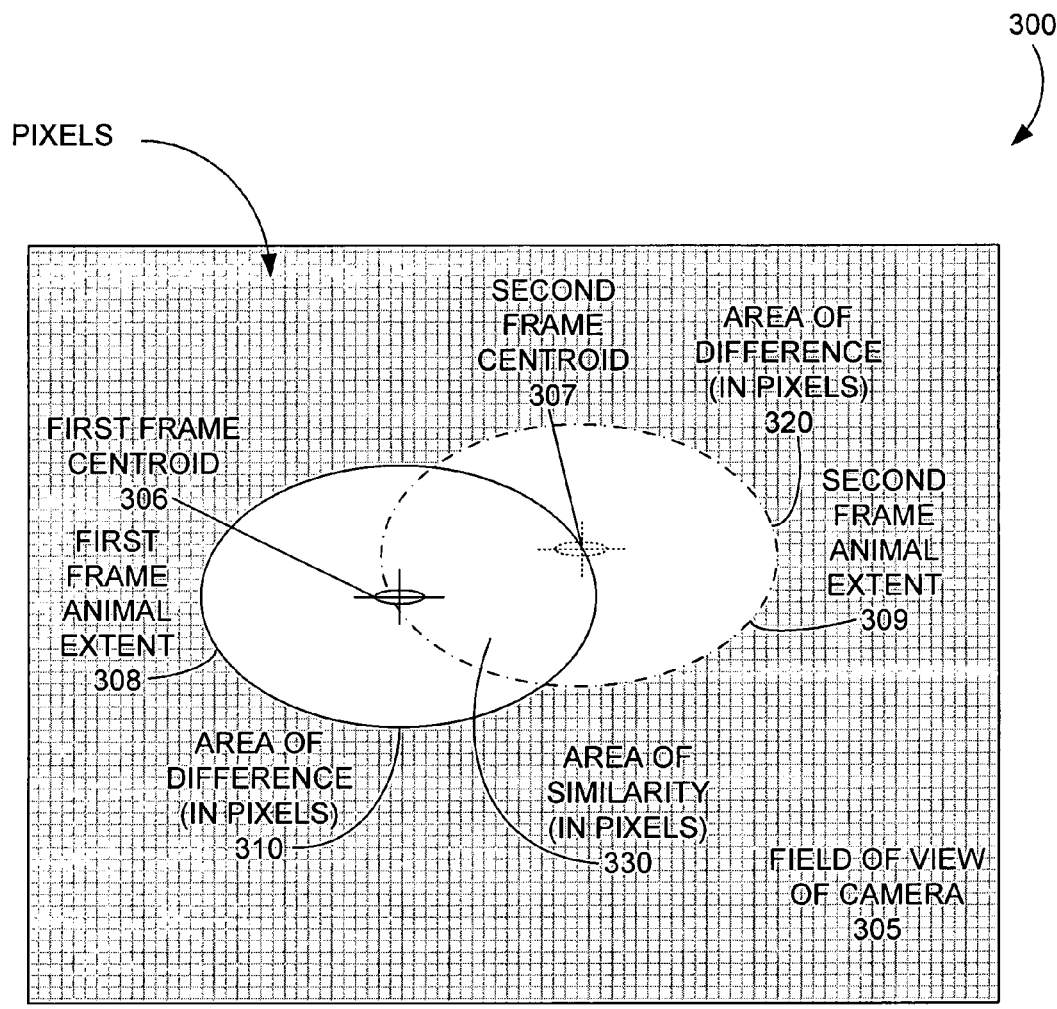
FIG. 3A illustrates a change of extent and centroid position of a test animal between a first video frame and a second video frame when the animal is not in a fear mode.

Turning now to FIG. 3A, illustrated are two video frames which show an animal moving between two points in time. The first frame animal extent 308 has a first centroid 306 (as determined by the centroid calculator 280) and a second frame animal extent 309 has a second centroid 307, centroids 306 and 307 corresponding to the position of the test animal at the times when the frames were captured. There is one area of similarity 330 between the first frame animal extent 308 and the second frame animal extent 309. There are also areas of difference 310 and 320. As will be clear to one of ordinary skill in the art, the result of the pixel-by-pixel XOR operation within the XOR processor 285 are the areas of difference 310 and 320. The XOR processor 285 additionally counts the number of pixels within the areas of difference 310 and 320 to determine the "motion measure". The XOR processor 285 optionally normalizes the motion measure by dividing it by the number of animal pixels in the second frame animal extent 309. A low value of this motion measure (normalized or non-normalized) can indicate a fear reaction on the part of the test animal. In the illustration of FIG. 3A, this is a relatively high normalized ratio, probably indicating the lack of a fear reaction upon the part of the test animal.

Figure 3B:
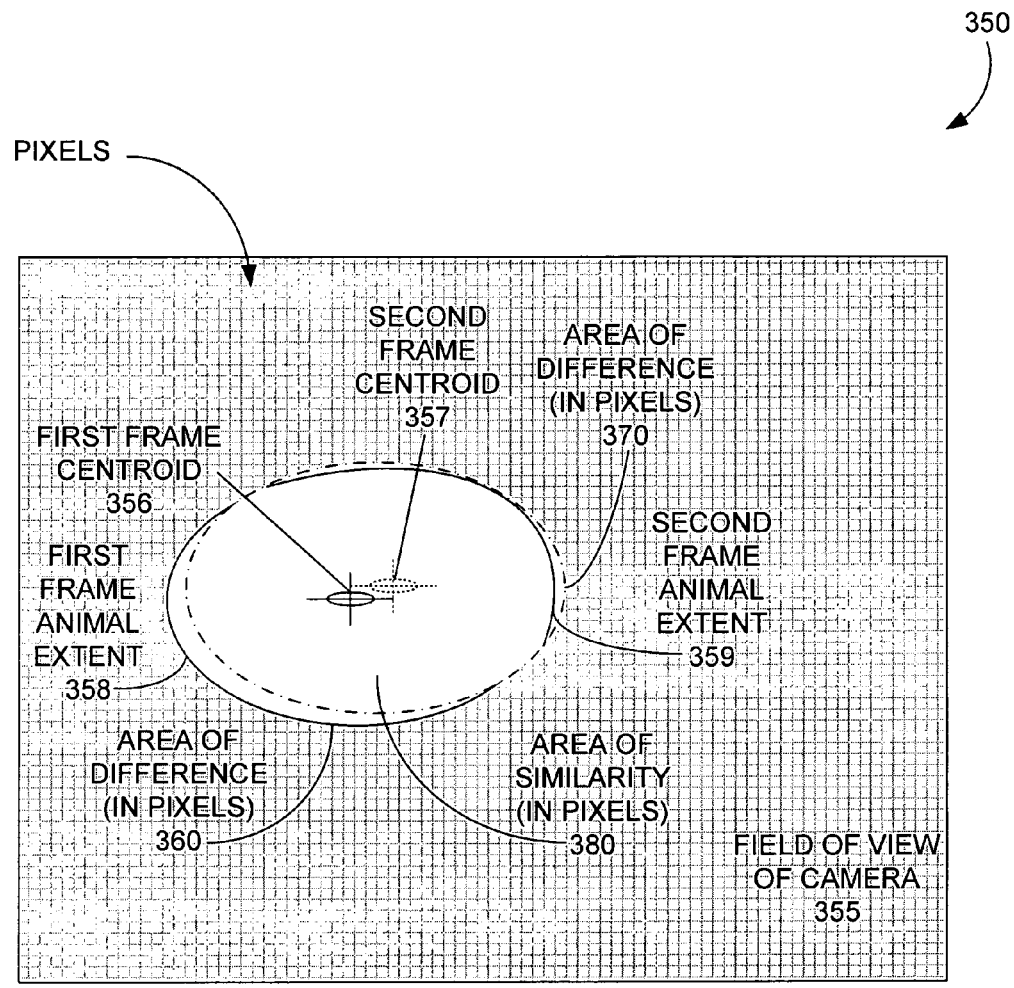
FIG. 3B illustrates the extent and centroid of a test animal in a fear mode remaining relatively stationary between a first video frame and a second video frame.

Turning now to FIG. 3B, illustrated are two video frames which show an animal with minimal movement between two points in time. The first frame animal extent 358 has a first centroid 356 (as determined by the centroid calculator 280) and a second frame animal extent 359 has a second centroid 357, centroids 356 and 357 corresponding to the position of the test animal at the times when the frames were captured. There is one area of similarity 380 between the first frame animal extent 358 and the second frame animal extent 359. There are also areas of difference 360 and 370. As will be clear to one of ordinary skill in the art, the result of the pixel-by-pixel XOR operation within the XOR processor 285 is the areas of difference 360 and 370. The XOR processor 285 additionally counts the number of pixels within the areas of difference 310 and 320 to determine the "motion measure". The XOR processor 285 optionally normalizes the motion measure by dividing it by the number of animal pixels in the second frame animal extent 309. A low value of this motion measure (normalized or non-normalized) can indicate a fear reaction on the part of the test animal. In the illustration of FIG. 3B, this is both a very small change in centroid location as well as very low inter-frame motion measure, probably indicating a fear reaction upon the part of the test animal.

Figure 3C:
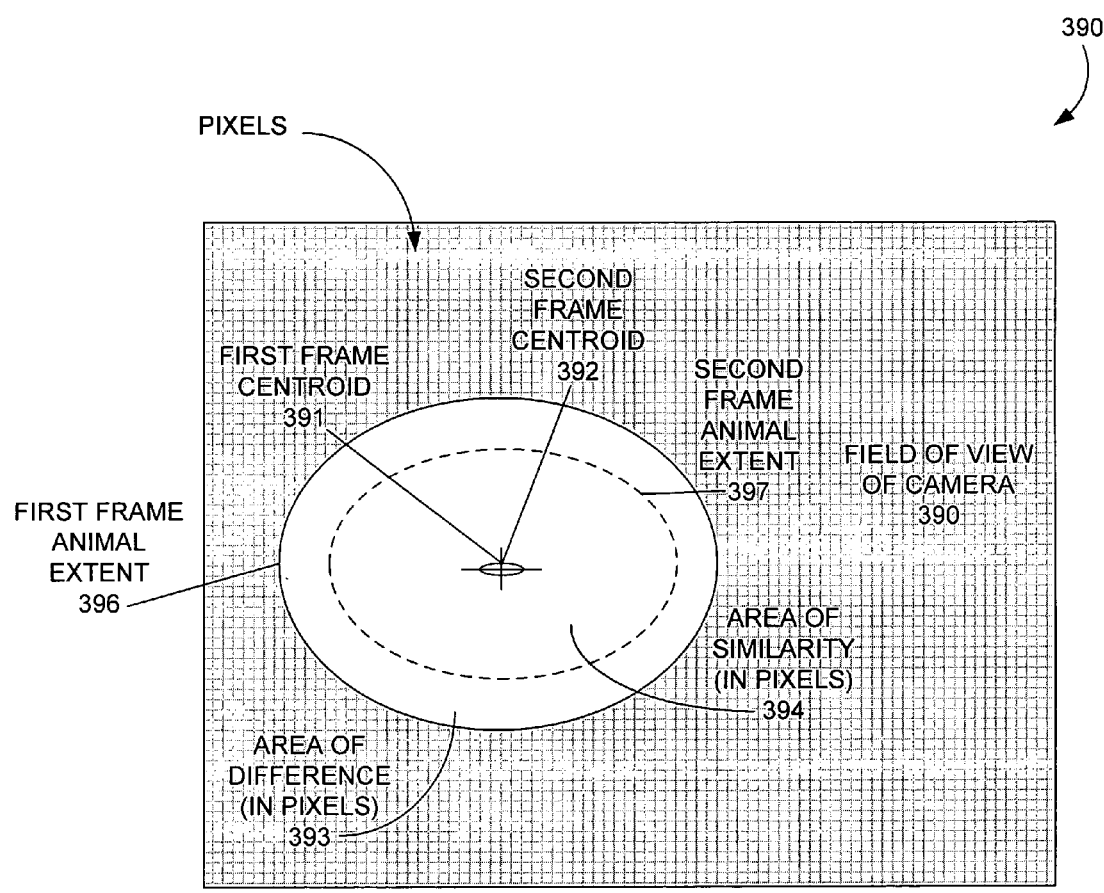
FIG. 3C illustrates the extent and centroid of a test animal in a substantially stationary grooming mode, wherein the test animal extent is significantly greater in the second video frame than the first video frame.

Turning now to FIG. 3C, illustrated are two video frames which show an animal moving between two points in time.

The first frame animal extent 396 has a first centroid 391 (as determined by the centroid calculator 280) and a second frame animal extent 397 has a second centroid 392, centroids 391 and 392 corresponding to the position of the test animal at the times when the frames were captured. There is one area of similarity 394 between the first frame animal extent 396 and the second frame animal extent 397. There is also an area of difference 393. As will be clear to one of ordinary skill in the art, the result of the pixel-by-pixel XOR operation within the XOR processor 285 is the areas of difference 393. The XOR processor 285 additionally counts the number of pixels within the areas of difference 310 and 320 to determine the "motion measure". The XOR processor 285 optionally normalizes the motion measure by dividing it by the number of animal pixels in the second frame animal extent 397. A low value of this motion measure (normalized or non-normalized) can indicate a fear reaction on the part of the test animal. In the illustration of FIG. 3C, the centroid locations 391 and 392 have not changed from the first to the second frame, but the inter-frame motion measure remains relatively high. In this case the animal is probably not experiencing a fear reaction, but is more likely breathing or grooming in a stationary position.

Figure 4:
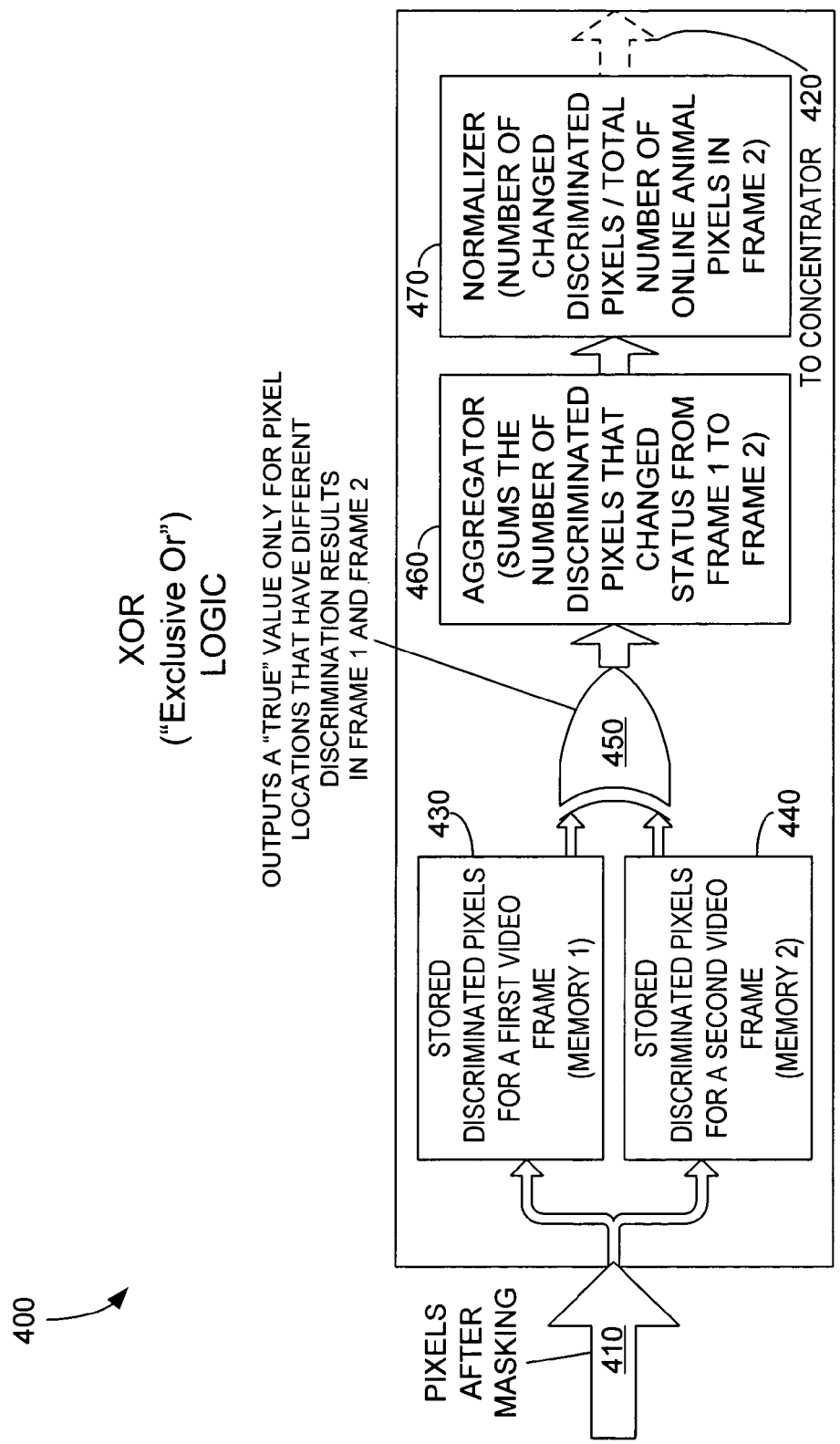
FIG. 4 illustrates an XOR processor.

Turning now to FIG. 4, disclosed is frame comparison logic, an XOR processor 400. The XOR processor 400 receives data representing pixels for the video frame after the masking over a bus 410. The data is then split up into a first memory 430 and a second memory 440. In the first and second registers 430, 440 are the processed pixel statuses for every pixel of the first and a second video frame.

Each pair of pixel statuses is compared within the XOR 450. For instance, the discriminated value/status for pixel (4,4) of the first video frame is compared to the discriminated value/status for pixel (4,4) of the second video frame. If both statuses for the two corresponding pixels are the same, then a logical value of false ("0") is output by the XOR 450. Otherwise, a logical value of true ("1") is output by the XOR 450. These values are then input into an aggregator 460. Within the aggregator 460, all of the logical true values are counted. Coupled to the aggregator 460 is a normalizer 470. The normalizer 470 divides the number of "true" values recorded by the aggregator 460 by the total number of pixels corresponding to the test animal in the second frame. In an alternate embodiment, the normalizer 470 divides the number of "true" values recorded by the aggregator 460 by the total number of pixels corresponding to the test animal in the first frame. Other normalization techniques are possible. This generates a normalized output, the magnitude of which is inversely proportional to the likelihood of the test animal is undergoing a fear reaction. This normalized output can then be combined with centroid displacement information between video frames. The normalized value is transmitted over a bus 420 to the MAP 295. In an alternative embodiment, the MAP 295 receives the output from the XOR 450 without further processing, and the MAP 295 or some other device performs the functions of the aggregator 460 and the normalizer 470.

Figure 5:
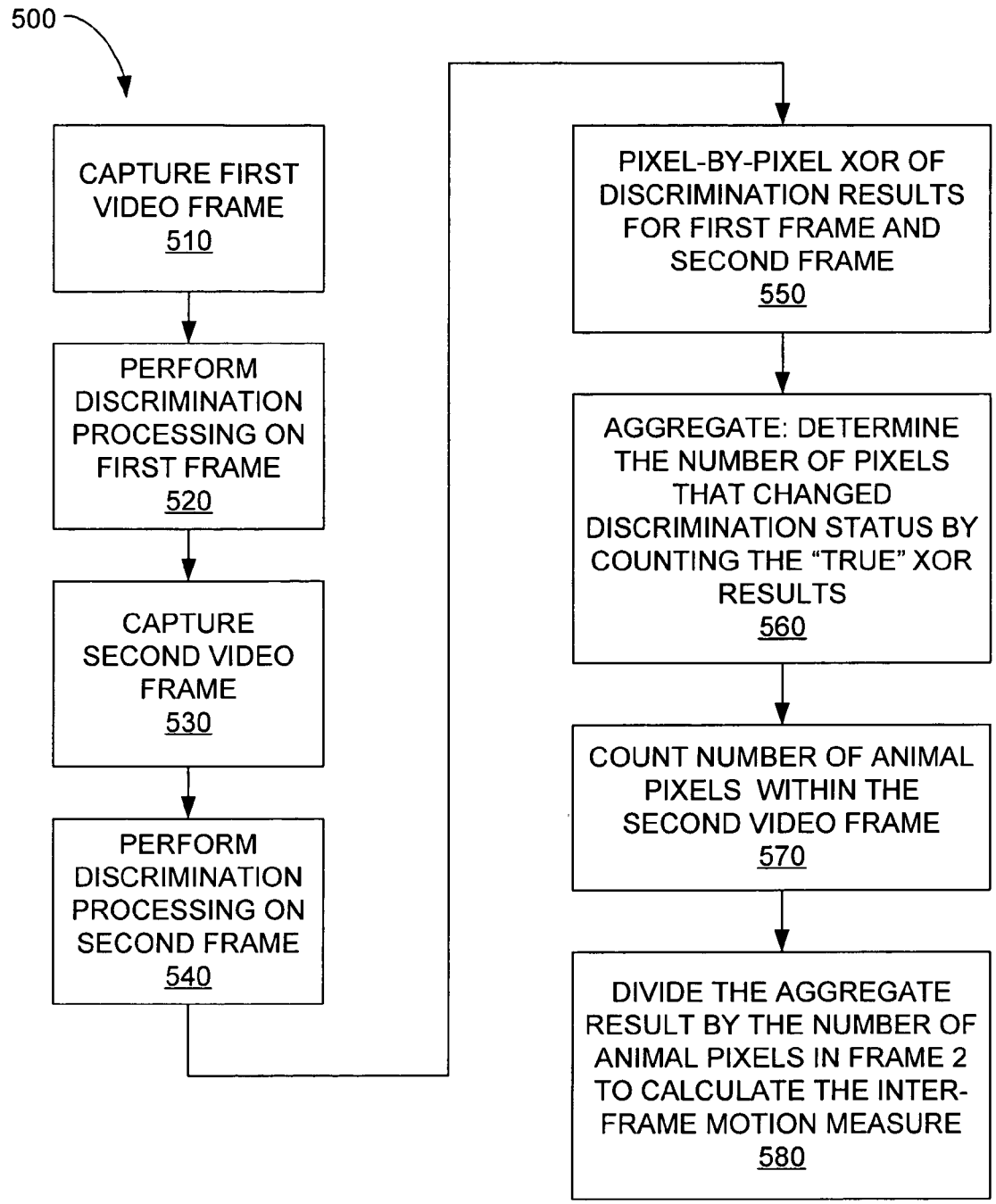
FIG. 5 illustrates a method for determining a degree of similarity of pixels occupied by an object in a first video frame and in a second video frame.

Turning now to FIG. 5, disclosed is a method 500 for determining the normalized change of animal pixels from video frame to video frame. This normalized value represents the relative fear reaction of a test animal, and is a function of an inter-frame motion detection calculation of the XOR logic 400. In step 510, a first video frame is captured of the test animal. In step 520, the various discrimination techniques are performed upon the first video frame leading to each pixel of the frame being given a status of either on-animal or off-animal. In the preferred embodiment, on-animal pixels are given a value of '1' representing 'true' and off-animal pixels are given a value of '0' representing 'false'. These discrimination techniques can include threshold comparison, inversion, detail removal, and so on. In step 530, a second video frame is captured. In step 540, similar processing is performed on the second video frame as is performed on the first video frame.

In step 550, XOR values are generated for each corresponding pixel on the first and second video frames. These values are a logical high if the discriminated pixels change and a logical low if the pixels stay the same. In step 560, the number of logical highs is counted within the aggregator, the processor 296, or other processing device. In step 570, the number of on-animal pixels in the second video frame is determined. In step 580, the number of changed discrimination pixels is divided by the total number of animal pixels within the second frame, thereby generating a normalized value which corresponds to an inter-frame motion measure.

It is understood that the present invention can take many forms and embodiments. Accordingly, several variations can be made in the foregoing without departing from the spirit or the scope of the invention. For example, video frame 1 and video frame 2 need not be consecutive video frames. As a further example, the techniques presented can be extended to consider more than two frames.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention can be employed without a corresponding use of the other features. Many such variations and modifications can be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. An apparatus for determining the extent of movement of an object appearing within two or more images, comprising:
    a first logic configured to classify one or more points in each of the images as either on-object or off-object;
    a second logic configured to compare the classified points in order to determine those points for which the classification differs; and
    a third logic configured to aggregate those points for which the classification differs in order to quantify a measure of the movement of the object.

2. The apparatus of claim 1, wherein the first logic further comprises memory employable for the storage of at least one video frame.

3. The apparatus of claim 1, further comprising an inverter coupled to the input of the first logic, the inverter configured to invert pixels before the pixels are conveyed to the frame comparison logic.

4. The apparatus of claim 1, further comprising a memory for a mask coupled to the input of the first logic, the mask configured to be applied to at least one pixel before the at least one pixel is conveyed to the frame comparison logic.

5. The apparatus of claim 1, further comprising a threshold comparator coupled to the input of the first logic, the first logic configured to determine whether a value associated with at least one pixel is above or below a threshold value.

6. The apparatus of claim 1, wherein the first logic comprises exclusive-or logic.

7. The apparatus of claim 1, further comprising an aggregator configured to accept an output of the first logic.

8. The apparatus of claim 7, flirt her comprising a normalizer configured to divide an output of the aggregator by the total number of pixels in a second video frame associated with an image of a test animal.

9. The apparatus of claim 1, wherein the memory for storing at least one video frame for processing by the frame comparison logic is at location externally to the first logic.

10. The apparatus of claim 1, wherein the second logic calculates a normalized ratio associated with the change of the status of pixels from a first video frame and the second video frame.

11. A method for determining the extent of movement of an object appearing within two or more images, comprising:
classifying each point in the images as either on-object or off-object to create classified images; and
comparing one classified image to at least one other classified image to determine those areas for which the classification differs;
measuring at least one neurological impulse; and
correlating the determination of those areas for which the classification differs to the measurement of the at least one neurological impulse.

12. The method of claim 11, wherein the step of classifying comprises thresholding the image to create a thresholded image.

13. The method of claim 12, further comprising masking the thresholded image.

14. The method of claim 12, further comprising removing details from the thresholded image.

15. The method of claim 11, wherein the images are monochrome.

16. The method of claim 11, wherein each of the images is represented as a finite number of digital picture elements.

17. The method of claim 11, further comprising time-stamping the plurality of neurological impulses.

18. The method of claim 17, further comprising correlating a centroid calculation to the time-stamped neurological impulses.

19. A computer program product for determining the extent of movement of an object appearing within two or more images, the computer program product comprising a computer-readable medium with a computer program embodied thereon, the computer program comprising:
computer code for classifying each point in the images as either on-object or off-object to create classified images; and
computer code for comparing one classified image to at least one other classified image to determine those areas for which the classification differs;
computer code for measuring a plurality of neurological impulses; and
computer code for correlating the determination for which the classification of the at least one image to the at least one other image differs to the measurement of the at least one neurological impulse.

20. A processor for determining the extent of movement of an object appearing within two or more images, the processor including a computer program comprising:
classifying each point in the images as either on-object or off-object to create classified images; and
comparing one classified image to at least one other classified image to determine those areas for which the classification differs;
measuring a plurality of neurological impulses; and correlating the determination for which the classification of the at least one image to the at least one other image differs to the measurement of the at least one neurological impulse.

* * * * *